United States Patent [19]

Miyasaka

[11] Patent Number: 5,107,104
[45] Date of Patent: Apr. 21, 1992

[54] PHOTOELECTRIC TRANSDUCER HAVING PHOTOSENSITIVE CHROMOPROTEIN FILM, I.E. BACTERIORHODOPSIN

[75] Inventor: Tsutomu Miyasaka, Kanagawa, Japan

[73] Assignee: Fuji Photo Film Co., Ltd., Kanagawa, Japan

[21] Appl. No.: 599,524

[22] Filed: Oct. 18, 1990

[30] Foreign Application Priority Data

Oct. 18, 1989 [JP] Japan ................. 1-271079

[51] Int. Cl.⁵ .............................. H01J 40/14
[52] U.S. Cl. ........................ 250/211 R; 357/8
[58] Field of Search .......... 250/211 R, 214 R, 214 A; 136/263; 357/8, 30 H, 30 I, 30 J; 430/495

[56] References Cited

U.S. PATENT DOCUMENTS

| | | | |
|---|---|---|---|
| 3,770,968 | 11/1973 | Hession et al. | 250/214 A |
| 3,995,174 | 11/1976 | Zrudsky | 307/584 |
| 4,303,831 | 12/1981 | El Hamamsy | 250/551 |
| 4,420,724 | 12/1983 | Owen | 250/214 A |
| 4,804,834 | 2/1989 | Katsura et al. | 250/211 R |

FOREIGN PATENT DOCUMENTS

| | | |
|---|---|---|
| 59-197849 | 11/1984 | Japan. |
| 62-11158 | 1/1987 | Japan. |
| 62-63825 | 3/1987 | Japan. |

*Primary Examiner*—Edward P. Westin
*Assistant Examiner*—S. Allen
*Attorney, Agent, or Firm*—Sughrue, Mion, Zinn, Macpeak & Seas

[57] ABSTRACT

A photoelectric transducer which comprises a photoresponsive electrode, which is provided with an oriented film of a photosensitive chromoprotein at the interface of an electrically conductive electrode substrate and an electrolyte, combined with a counter electrode.

4 Claims, 3 Drawing Sheets

2

PHOTOELECTRIC TRANSDUCER HAVING PHOTOSENSITIVE CHROMOPROTEIN FILM, I.E. BACTERIORHODOPSIN

FIELD OF THE INVENTION

The present invention relates to a photoelectric transducer based on an electrochemical means. The photoelectric transducer of the present invention, which can convert faint rays absorbed by an ultra-thin film comprising a photosensitive chromoprotein such as rhodopsin into an electrical signal through a rapid response, may be effectively used as an optical sensor or an optical switch.

BACKGROUND OF THE INVENTION

Photosensitive chromoproteins such as rhodopsin are characterized in that they can absorb visible rays and efficiently convert them into a chemical work through a cyclic reaction system. As the results of light-absorption, rhodopsins can actively transport a proton in one direction, which is called a proton pump. Well known examples of rhodopsin photosensitive chromoproteins include rhodopsin and bacteriorhodopsin which are visual pigments. In particular, the application of bacteriorhodopsin to photoelectric devices has attracted public attention, since it shows an excellent stability in vitro.

In order to harness the photoresponse of bacteriorhodopsin as a physical signal in vitro, photoelectrical conversion, which may be advantageously applied to devices, is commonly employed.

For the photoelectrical conversion, films comprising somewhat oriented molecules are generally required. These films are mainly produced by, for example, the electric field orientation method, static adsorption method and Langmuir-Blodgett (LB) method.

A commonly known method for photoelectrical conversion with the use of an oriented bacteriorhodopsin film comprises preparing a sandwich-type dry cell wherein said film is inserted between two electrically conductive electrode substrates and monitoring a photovoltaic response. This method is reported by, for example, K. Nagy (Biochem. Biophys. Res. Commun., 85, 383-390 (1978)) and G. Varo (Acta Biol. Acad. Sci. Hung., 32, 301-310 (1981)). In these examples, electrodeposited bacteriorhodopsin films produced by the electric field orientation method are used. This method is characterized in that a high photoelectromotive force (several V) can be obtained by using a relatively thick membrane (1 or above at a usual absorbance). Since the film has an extremely high resistance (usually $10^{10}$ M$\Omega$/cm), however, it is difficult in this method to obtain the response in the form of a photoelectric current which is superior from the viewpoint of linearity of the response dose being in correspondence with the absorbed light energy. An electric current response can be also obtained by, for example, converting an electric signal with the use of an electric field effect transistor (FET) as shown by JP-A-62-63823. (The term "JP-A" as used herein means an "unexamined published Japanese patent application"). However the inherent nonlinearity of the output given by the generated photoelectromotive force cannot be improved thereby.

T. Furuno et al. (Thin Solid films, 160, 145-1151 (1988)) disclose a process for obtaining photoelectric conversion as an electric current signal which comprises preparing a sandwich cell by laminating a Langmuir-Blodgett (LB) film of a purple membrane containing bacteriorhodopsin onto an electrode. In this case, however, the obtained photoelectric current is extremely faint (in the order of $10^{-11}$ A), even though several tens of films are laminated.

These sandwich-type photovoltaic cells are further disadvantageous in that electrical leakage is frequently observed between two electrodes adhering photosensitive chromoprotein film(s). In the case of an ultra-thin film such as a LB film, in particular, it becomes more and more difficult to control the leakage as the thickness of the film decreases. The use of a LB film comprising a smaller number of layers is useless in practice, since the current output is lowered in this case. In the case of the above-mentioned dry cells, furthermore, the moisture contained in the films or in the environment would significantly affect the response sensitivity, which causes an essential problem in the reproducibility of the output.

Different from the system of these dry cells, it has been reported to employ a photosensitive chromoprotein film, which is prepared by using various carriers or lipid bilayer films, as a permeable membrane partitioning electrolyte and giving a difference in photopotential between the both sides of the permeable membrane between two electrodes in the electrolyte as a change in voltage or current (refer to, for example, K. Singh et al., Biophys. J., 31, 393-401 (1980); L. A. Drachev et al., FEBS Letters, 39, 43-43 (1974); M. C. Blok et al., FEBS Letters, 76, 45-50 (1977); JP-A-62-9228). However these methods are disadvantageous in that the photoresponsive film is not joined to the electrode material and thus the response is transmitted via the ion conduction of a solution, which causes an extremely low response rate (at a level of a second to a minute). Furthermore, the use of the permeable membrane makes it difficult to form a device in the form of a film.

Accordingly, JP-A-59-197849 and JP-A-62-11158 each propose a process wherein the phototransport conducted by bacteriorhodopsin in water is directly applied to a filmy base of a pH-sensitive transducer (in particular, an ion-sensitive FET=ISFET) to thereby give an electric signal. pH-sensitive or ion-sensitive electrodes including ISFET are characterized in that a change in proton or ion concentration is given as a change in the surface potential of an electrode material. That is to say, a so-called potentiometric means is employed in these systems. However, these potentiometric methods have some disadvantages, for example, a low accuracy, unstable data and a low response rate when applied to a transport protein such as rhodopsin.

Known photoelectric conversion systems with the use of photosensitive chromoproteins may be roughly classified into three types, namely, those wherein a film of said photosensitive chromoprotein is inserted between electrodes so as to harness the photoelectromotive force; those wherein said film is used as a permeable membrane in an electrochemical cell so as to harness the photoelectromotive force; and those wherein said film is fixed to an ion-sensitive transducer so as to potentiometrically detect a photoresponse. In the first type, the film should have a sufficient thickness in order to secure the output and to form a device. As a result, a large amount of the protein should be used, which causes a problem from an economical point of view. This type suffers from a further problem, namely, the response sensitivity is largely affected by, for example, moisture.

In addition, in each of these three types the output is obtained as the electromotive force, and thus the response dose shows no linearity against the input, i.e., light amount. This fact causes another problem when they are to be applied to, for example, an optical sensor. The second and third types suffer from an additional problem, namely, a low response rate, when applied to, for example, an optical switch.

SUMMARY OF THE INVENTION

Accordingly, it is a first object of the present invention to provide a photoelectric transducer by using a photosensitive chromoprotein film which has a high sensitivity and shows a high response rate. It is a second object of the present invention to provide an amperometric photoelectric transducer which shows an excellent reproducibility of the output and gives a rapid response. It is a third object of the present invention to provide a photoelectric transducer which gives a photoresponse of a high output even though an extremely thin film corresponding to several layers of an LB film is used.

These objects of the present invention have been successfully achieved by a photoelectric transducer capable of affecting amperometric photoelectric conversion which comprises a photoresponsive electrode, which is provided with an oriented film of a photosensitive chromoprotein at the interface of an electrically conductive electrode substrate and an electrolyte, combined with a counter electrode.

wherein 1 shows a transparent supporting material; 2 shows an electrically conductive film; 3 shows an oriented film of a photosensitive chromoprotein; 4 shows a spacer; 5 shows a counter electrode, 6 shows an electrolyte; 7 shows a reference electrode; 8 shows a supporting material; 9 shows a conductor wire; 10 shows an ammeter; and 11 shows a voltmeter for monitoring electric potential.

Figure 3:
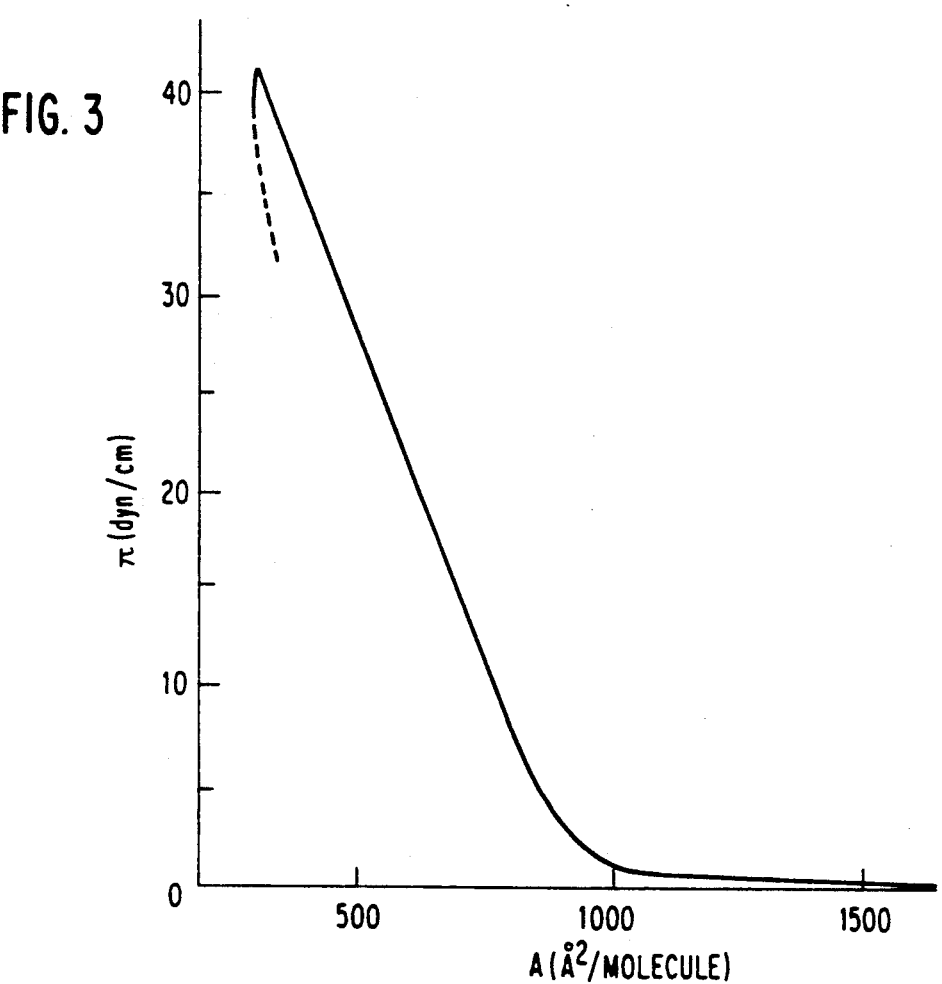

FIG. 3 is a graph of a $\pi$-A curve which shows the characteristics of the surface pressure ($\pi$) and the molecular occupation area (A) of a monolayer film of the photosensitive chromoprotein purple membrane of Example 1.

Figure 4:
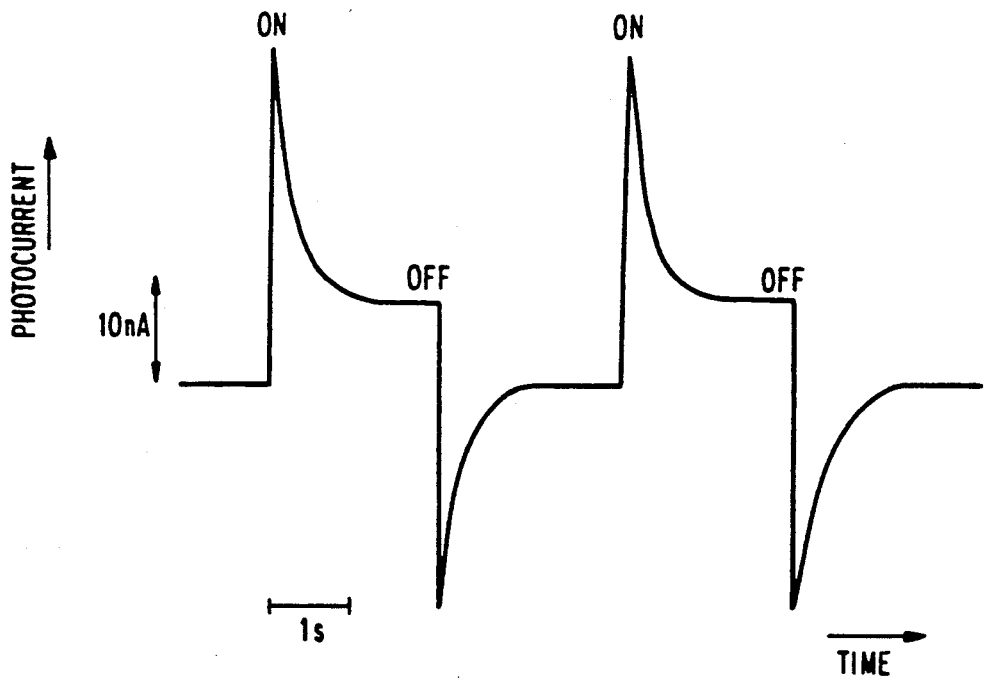

FIG. 4 is a graph showing the photocurrent response of the photoelectric transducer of Example 1.

Figure 5:
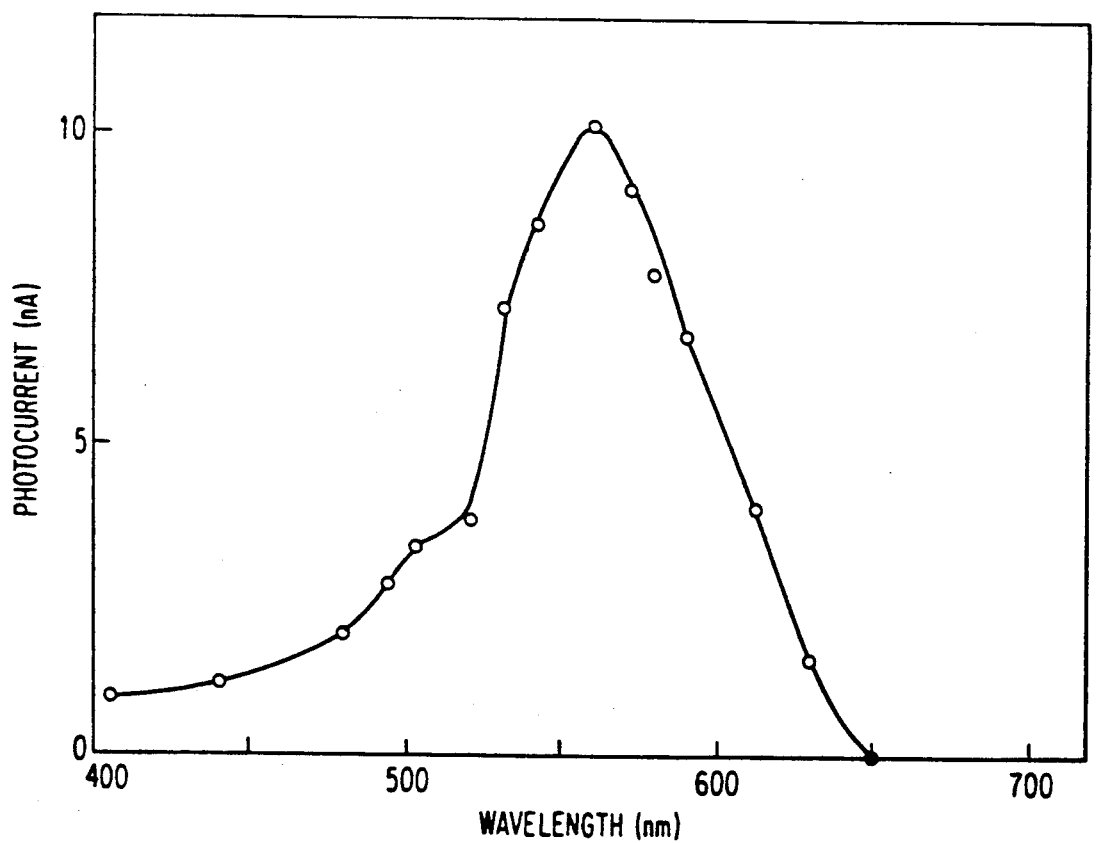

FIG. 5 is a graph showing the spectrum of the photocurrent response of the photoelectric transducer of Example 1.

DETAILED DESCRIPTION OF THE INVENTION

Figure 1:
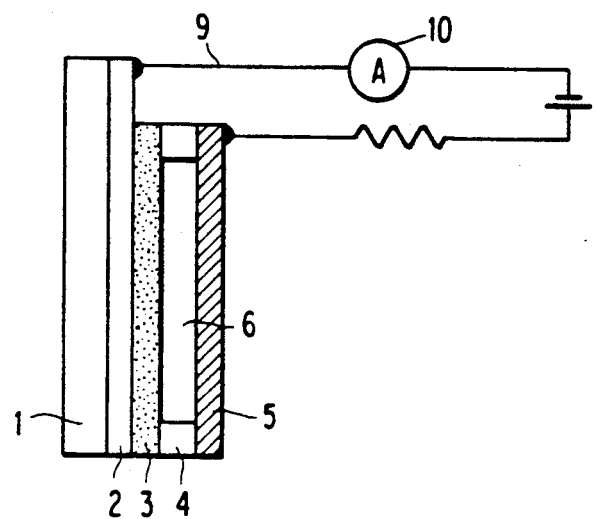
FIGS. 1 and 2 show each the construction of the photoelectric transducer of the present invention.
Figure 2:
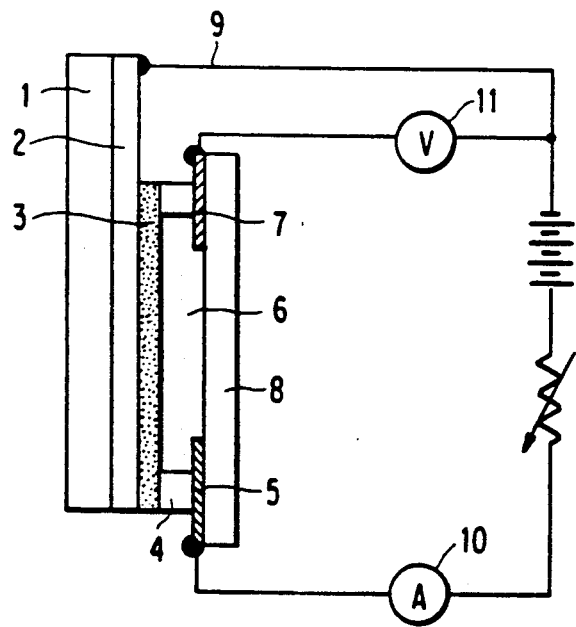

The photoelectric transducer of the present invention basically consists of at least four elements, namely, an electrically conductive electrode substrate (a working electrode), an oriented film of a photosensitive chromoprotein, an electrolyte and a counter electrode which are joined to each other in this order so as to form an electrochemical cell. That is, the photoelectric transducer comprises, in sequence, an electrically conductive electrode substrate, an oriented film of a photosensitive chromoprotein, an electrolyte, and a counter electrode. The photoelectric transducer may further involve a reference electrode as the third electrode element, if required. The referential electrode is located in the electrolyte. These two or three electrodes are connected to an external circuit and an external voltage may be applied between the working electrode and the counter electrode or the reference electrode. FIGS. 1 and 2 respectively show the constructions of typical devices of two and three electrode systems and circuits.

In FIGS. 1 and 2, 1 shows a transparent material supporting an electrically conductive electrode substrate 2 (a film is used herein), namely, a working electrode; 3 shows an oriented film of a photosensitive chromoprotein; 5 shows a counter electrode; 6 shows an electrolyte (typically an aqueous solution of a salt); 4 is a spacer for retaining 6; 7 shows a reference electrode; 8 shows a support for supporting the electrodes 5 and 7; 9 shows a conductive wire; 10 shows a device for measuring the current between the electrodes 2 and 5; and 11 is a voltmeter for monitoring the electrode potential.

The cell preferably has a film structure involving an electrolyte, as shown in FIGS. 1 and 2. However the present invention is not restricted thereby, so long as a similar joint construction is achieved. In FIGS. 1 and 2, the supporting material 1 and the electrically conductive electrode substrate 2 or the support 8 are selected from light-permeable materials so as to allow the photosensitive chromoprotein layer 3 to receive a photosignal from the outside. When the photosensitive chromoprotein layer 3 receives a photosignal from the side of the support 8 in FIG. 2, the support 8 and the electrolyte 6 are selected from light-permeable materials. The electrically conductive electrode layer 2 joined to the photosensitive chromoprotein may be patterned in order to, for example, take out pixels of the signal. In this case, plural conductor wires are led from plural electrically conductive electrode components, which are isolated from each other by patterning, and each conductor wire is provided with an ammeter 10.

In the construction of FIG. 2 having three electrodes, one of the useful setups for the external circuit involving the ammeter is a potentiostat.

Now each element constituting the photoelectric transducer of the present invention will be described.

Preferable examples of the electrically conductive electrode substrate carrying the photosensitive chromoprotein oriented film include various precious metals (for example, Au, Pt) and electrically conductive metal oxides (for example, $SnO_2$, $In_2O_3$, $RuO_2$). Among these materials, a film of Au or Pt (thickness $\leq$ 1000 Å) and a film of $SnO_2$, $In_2O_3$ or a composite thereof are preferable from the viewpoint of light permeability. $SnO_2$ and ITO are still preferably employed therefor, since they are excellent in the chemical stability of the electrode material and the S/N ratio in current upon photoresponse, in addition to having high light permeability.

The electrical conductivity of the $SnO_2$ and ITO films is preferably $10^2 \, \Omega^{-1}cm^{-1}$ or above, more preferably $10^3 \, \Omega^{-1}cm^{-1}$ or above.

These electrically conductive electrode materials may be provided on the transparent supporting material made of glass or resin (e.g., polyethylene terphtalate and polycarbonate) by, for example, vacuum metallizing or spattering in such a manner as to give a film of a thickness ranging from 100 to 10000 Å, preferably from 500 to 6000 Å.

As the counter electrode, the same materials as those cited above for the electrically conductive electrode materials are preferably used. When the transducer comprises two electrodes, namely, having no reference electrode, it is preferable that the counter electrode also serves as a reference electrode. In this case, it is most preferable to use a silver/silver oxide electrode as the counter electrode. When a reference electrode is used as the third electrode, preferable examples of the counter electrode involve silver/silver chloride, mercury oxide and saturated calomel electrode. In order to minimize the size of the photoelectric transducer, it is preferable to use a silver/silver chloride electrode. These counter electrode and referential electrode may be in the form of a film, a substrate plate or a microprobe. The counter electrode is naturally placed on a position where the counter electrode can contact with the electrolyte. The counter electrode may be provided on a transparent supporting material.

Examples of the electrolyte to be used in the present invention as an ion-conductive medium involve electrolytic aqueous solutions and solid electrolytes comprising inorganic or organic matters.

The electrolytic aqueous solution is an aqueous solution containing, preferably 0.01 to 5 M, more preferably from 0.1 to 2 M of a supporting salt. Examples of the supporting salt are KCl, NaCl, $K_2SO_4$, $KNO_3$, LiCl and $NaClO_4$. Among them, preferred examples are Neutral salts. The pH value of the aqueous solution is preferably around the neutral value, that is, preferably 5 to 10, more preferably 6 to 9. It is undesirable to use a buffer for controlling the pH value and the added amount of the buffer is limited to $10^{-3}$ mole/liter or less. Thus, the pH value is to be adjusted with the use of an acid or an alkali. It is preferable that the solution has been deoxidized.

The solid electrolytes are preferably used in the present invention. Examples of the solid electrolyte include inorganic compounds such as $H^+$-$WO_3$ system, $Na^+$-$\beta$-$Al_2O_3$ system, $K^+$-ZnO system, $PbCl_2$/KCl and $SnCl_2$; and polymer electrolytes prepared by introducing a salt as an ion carrier into a polymer medium such as gelatin, agar, polyvinyl alcohol and commonly employed cation exchange resins and anion exchange resins.

High molecular electrolytes having a high molecular organic material as a medium are preferably used for the solid electrolyte. Examples of the solid electrolyte are those comprised of high molecular organic material (e.g., gelatin, agar, polyacrylamide, polyvinylalcohol, known cation- or anion-exchange resins, and mixture thereof) as a medium, supporting salts as an ion carrier and, if required, water. The hydrogen-ion concentration of these electrolytes is preferably from 5 to 10, more preferably from 6 to 9 as pH value in order to obtain effective photoelectric conversion.

In the present invention, a photosensitive chromoprotein which is a biosubstance is used as a photoreceptor. The photosensitive chromoprotein may be selected from among proteins originating from living organism and derivatives thereof capable of absorbing light and efficiently converting the photoenergy into chemical work, for example, rhodopsin families including rhodopsin (visual pigment), bacteriorhodopsin, halorhodopsin, phoborhodopsin and archerhodopsin, and photosynthetic reaction center proteins. Among these compounds, bacteriorhodopsin is the most preferable in the present invention from the viewpoint of stability in vitro. Bacteriorhodopsin is a retinal protein having opsin as a protein and retinal as a chromophore, similar to rhodopsin (visual pigment). It may be purified in the form of a disc-type substance called purple membrane from the cell membrane of a highly halophilic bacterium (*Halobacterium halobium*) by, for example, a method reported by D. Oesterhalt and W. Stoeckenius, Methods Enzymology, 31, 667-678 (1974). It is considered that this purple membrane has a crystalline structure wherein a boundary lipid (approximately ⅓ of rhodopsin in weight) surrounds voids of two-dimensional hexagonal lattices comprising bacteriorhodopsin trimers (R. Henerson and P. N. T. Unwin, Nature, 275, 28-32 (1975)). Bacteriorhodopsin contains retinal (a vitamin A derivative) as a chromophore. A schiff bond is formed between the retinal and the $\epsilon$-amino group of lysine which is the 216th amino acid of the protein molecular chain. This bond brings about a long wavelength shift called "opsin shift" which imparts a wide visible absorption.

A rhodopsin photosensitive chromoprotein has a wide absorption in the visible region showing a peak at 550 to 560 nm. Thus it vectorially transports hydrogen ions though photoabsorption, i.e., the so-called proton pump action. The photopump action of rhodopsin is described in A. Ikegami, Tanpakushitsu, Kakusan, Koso, 34 (5), 440-461 and A. Ikegami et al., Springer Proc. Phys., 20, 173-182 (1987). Furthermore, studies on the application of this action to photoelectric conversion in vitro or the conversion of photoenergy into chemical energy such as pH change are described in, for example, K. Singh et al., Biophysical J., 31, 393-402 (1980) and K. Ihara and Y. Mukohara, FEBS Letters, 240, 128-152 (1988) as well as references cited therein.

The absorption wavelength region of the bacteriorhodopsin, which is preferably used in the present invention in particular, can be shifted toward the longer or shorter wavelength region by converting the retinal moiety (i.e., the chromophore) into various isomers or derivatives by chemical treatments. Examples of the retinal isomers and derivatives are as follows.

1. All trans retinal (absorption peak: 570 nm).
2. 13-cis-Retinal (absorption peak: 550 nm).
3. 3,4-Dihydroretinal (absorption peak: 593 nm).
4. 5,6-Dihydroretinal (absorption peak: 475 nm).
5. Retro-$\gamma$-retinal (absorption peak: 430 nm).

As T. Mogi. et al., Proc. Natl. Acad. Sci. USA, 8, 4148-4152 (1988) shows, further, a rhodopsin derivative having a different absorption wavelength region may be obtained by altering some portion of the amino acid sequence of rhodopsin through a genetic recombination procedure.

These rhodopsin derivatives having an altered absorption wavelength region may also be effectively used as a photoreceptor in the present invention.

The photosensitive chromoprotein to be used the present invention may be mixed with various binder materials during the film-formation process. Examples of the binder materials include amphiphatic compounds such as phospholipids, fatty acids, fatty acid esters, aliphatic amines and aliphatic amides; biopolymers such as collagen, albumin, cellulose and chitin; and synthetic polymer compounds such as polyethylene oxide, polyvinyl alcohol, polyacrylamide and polycarbonate. The photosensitive chromoprotein is mixed with the binder material, with the proviso that the amount of the photosensitive chromoprotein is 10 to 100 wt% in the film.

Now a means for integrating the photosensitive chromoprotein of the present invention, which is in the form of a film, into the photoelectric transducer will be described. It is highly preferred that the protein molecules of the photosensitive chromoprotein to be used in the present invention (for example, rhodopsin) are one-dimensionally oriented in the direction of the thickness of the film during the film-formation process. The use of the oriented film thus obtained can extremely improve the function of the present invention.

Examples of the film-formation process useful for the above-mentioned orientation of the photosensitive chromoprotein molecules include those with the use of an electrical field such as electrodeposition (refer to K. Nagy, Biochem. Biophys. Res. Commun., 85, 383-390 (1978)), those with the use of a magnetic field (refer to D. Neugebauer et al., FEBS Letters, 78, 31-35 (1977)), LB film formation methods (refer to T. Furuno et al., Thin Solid Films, 160, 145-151 (1988)) and those with the use of the adsorption properties of, for example, a cationic film to the surface of a specific material (refer to A. E. Blaurock, J. Mol. Biol., 93, 139-158 (1975) or K. Singh et al., Biophys. J., 31, 393-402 (1980)). Preferred examples include those with the use of an electrical field and LB film formation methods.

As LB film-formation methods, for example, the methods described in, e.g., T. Furuno et al, Thin Solid Films, 160, pp. 145 to 151 (1988) and S. B. Hwang et al, J. Membrane Biol., 36, pp. 115 to 135 (1977) can be used. The ultra-thin film made of preferably from 2 to 50 LB films, more preferably from 4 to 10 LB films, is used in order to obtain a photoelectric transducer having a full sensitivity. It is a big characteristics in the present invention that such an ultra-thin film can be applied as a thin film of bacteriorohdopsin. The use of the ultra-thin film results in rapid photoresponse. Since the optical absorption of the thin film is minimized, a color image receiving element can be prepared by superposing some elements of bacteriorhodopsin having different photosensitive wavelength regions to each other and forming multilayer structure. By joining this ultra-thin film to the foresaid electrolyte, a photoelectric transducer having a superior sensitivity can be obtained.

Each of these means is useful in the formation of the oriented film of the present invention. According to these means, therefore, the protein molecule oriented film is provided on the surface of the substrate of the electrically conductive electrode (i.e., the working electrode).

The thickness of the film thus formed may preferably range from 20 to 10,000 Å, more preferably from 20 to 1,000 Å in order to lower the electric resistance. Among the above-mentioned processes, the LB-film formation method and adsorption method are particularly useful in order to obtain a film of a less thickness (500 Å or below).

In the photosensitive chromoprotein oriented film to be used in the present invention, the photosensitive chromoprotein molecules (in the case of bacteriorhodopsin) are preferably oriented in such a direction that the amino-terminal (cation residue terminal) of each protein molecule is oriented toward the electrically conductive electrode (working electrode). Such an orientation can be achieved by taking advantage of e.g., the adsorption orientation of cation/anion interaction. From this point of view, it is preferable that the electrode substrate, on which the rhodopsin molecules are to be carried, has an oxide surface (namely, a surface having hydroxyl groups).

The photoelectric transducer of the present invention gives an electrical current response to the external circuit corresponding to the ON/OFF of the incidence of light. In order to give an electrical current response of a higher S/N ratio, it is preferable that the working electrode carrying the photosensitive chromoprotein is in an electrochemically cathodic polarization state. The cathodic polarization state can be achieved by applying a negative bias to said working electrode or the reference electrode from the external circuit. This bias generally ranges from $-0.1$ to $-0.5$ V, preferably from $-0.1$ to $-0.45$ V against e.g., the saturated calomel electrode (SCE).

The present invention is now illustrated in greater detail by reference to the following examples which, however, are not to be construed as limiting the present invention in any way.

EXAMPLE 1

According to the method reported by Oesterhalt et al., a purple membrane containing bacteriorhodopsin as a photosensitive chromoprotein was isolated from Halobacterium halobium and purified. Then it was dispersed in pure water to thereby give a dispersion of an absorbance of 7.0 (560 nm).

To 100 $\mu$l of the purple membrane dispersion, 100 $\mu$l of hexane was added and the mixture was shaken under stirring in a Voltex mixer. Further, 20 $\mu$l was added thereto and the mixture was mixed under stirring with the combined use of the Voltex mixer and an ultrasonic water-bath. Thus a purple membrane suspension was obtained.

The supernatant (i.e., some portion of the hexane) was removed from the suspension and the residue was developed on a pure water phase containing 5 mM of calcium ion employed as a developing solvent. Thus a monolayer film of the oriented purple membrane was formed. The surface pressure ($\pi$)/molecule occupation area (A) of the monolayer film thus obtained on Langmuir balance film was determined to thereby give a curve shown in FIG. 3.

The oriented monomolecular LB film of the purple membrane was prepared in the following manner. The $SnO_2$ layer of a transparent electrically conductive electrode carrying the $SnO_2$ layer of 4000 Å in thickness and $3 \times 10^3 \, \Omega^{-1}cm^{-1}$ in electric conductivity was patterned by etching with hydrochloric acid and zinc. Then the monolayer purple membrane on the water surface was transported onto the $SnO_2$ surface of the patterned $SnO_2$ substrate under a controlled surface pressure of 30 dyn/cm. This procedure was repeated thrice. Thus three layers (100 to 150 Å) of the monolayer film were laminated onto the substrate. Then the laminated film was dried by allowing to stand for one hour. Thus an ultra-thin film (about 0.5$\mu$) of the purple membrane was formed on the $SnO_2$ electrically conductive glass.

As the counter electrode, a silver-deposited glass (film thickness of silver: 1000 Å) was employed. The silver-deposited face of the counter electrode was located opposite to the above-mentioned $SnO_2$/purple membrane electrode (working electrode) and a Teflon ring of 1 mm in thickness was inserted between them as a spacer. These materials were adhered to each other so as to give a cell. A 0.1 M aqueous solution of KCl was poured into the cell as a supporting salt electrolyte followed by sealing. Thus a thin layer cell of approximately 3 mm in the total thickness was formed.

The working and counter electrodes were joined to conductor wires and thus connected to an external circuit, as shown in the above-mentioned FIG. 1, to thereby form a circuit for determining the photoresponse. Next, an external voltage of $-0.40$ V was applied to the working electrode so as to cause the cathodic polarization of the purple membrane electrode. Thus a cathodic current of approximately 100 nA was observed in the external circuit.

A xenon lamp (150 W) was used as a light source and the cell set in the above-mentioned state was irradiated with green light from the side of the working electrode through an IR cut filter and a band pass filter (wavelength of transmission center: 550 nm). Simultaneously with the irradiation, a rise in the cathodic photocurrent of approximately 20 nA/cm$^2$ was observed in the external circuit. When the irradiation ceased, the current returned to the initial level. The photocurrent response caused by ON/OFF of the light could be repeated more than 10$^3$ times. FIG. 4 shows the behaviors of the photoresponse.

Next, spectroirradiation was conducted and thus the spectrum of the photocurrent response was determined. As a result, a working spectrum corresponding to the photoabsorption by the bacteriorhodopsin was observed, as shown in FIG. 5. The photoresponsive rate of this photoelectric transducer cell was less than 10 ms.

EXAMPLE 2

50 μl of a purple membrane suspension (absorbance 14.0) was added dropwise onto the SnO$_2$ layer of the same SnO$_2$ electrically conductive glass as the one used in Example 1 and developed to thereby form a thin layer of the suspension. A platinum electrode was located above the thin layer via a air layer of 1 mm in thickness parallel to the SnO$_2$ substrate. Then an electric field of 2000 V/cm was applied between the SnO$_2$ based and the platinum electrode in such a manner that the SnO$_2$ side was negative. The system was then allowed to stand in the atmosphere so as to dry the purple membrane. Thus a dry oriented film was formed. This dry film was immersed in water together with the substrate and shaken. Thus the dry film was once peeled from the substrate. As a result, an extremely thin adsorption layer of the purple membrane remained on the SnO$_2$ layer. Thus an oriented ultra-thin film was formed on the SnO$_2$.

A thin film having a dry film thickness of 3 μm, which was made of a mixture (1:1 weight ratio) of a gelatin and polyacrylamide, was used as an electrolyte. This film was placed on the surface of a 0.1 M aqueous solution of KCl (pH=7.5) and allowed to swell.

This gelatin film was placed on the SnO$_2$ layer adsorbing the above-mentioned purple membrane and sandwiched between said SnO$_2$ and a silver-deposited glass which was used as the counter electrode, Thus a thin layer cell of approximately 2 mm in the total thickness comprising SnO$_2$/purple membrane/gelatin (KCl)/AgCl/Ag was obtained.

Similar to Example 1, the working electrode (SnO$_2$) and the counter electrode (Ag) were connected to the external circuit and a controlled potential of −0.4 V was applied to the working electrode against the counter electrode.

When the cell was irradiated with band light of a center of 550 nm from the light source, a photocurrent response similar to the one shown in FIG. 4 was detected.

EXAMPLE 3

Photoelectric Transducer Samples 1 to 8 were prepared in the same manner as in Example 1 except that 0.1 M aqueous solutions of KCl having a pH value of 4.0, 4.5, 5.0, 7.0, 8.5, 9.0, 10.0 and 11.0, respectively were used as electrolytes. Photocurrent response of these samples was measured. As voltage (E) for the measurement, −0.1 V vs. SCE and −0.3 V vs. SCE were applied. The results are shown in Table 1.

As it can be seen from Table 1 that the photoresponse was obtained when the pH value of the electrolyte falls within 5 to 10 at both the voltages and decreases in both the lower acidic range and the higher alkaline range of the electrolyte. Therefore, it is apparent that the pH range of the electrolyte for effectively photoelectric conversion falls within preferably from 5 to 10 and, particularly, the remarkable effect is obtained at the pH value of from 7.0 to 9.0.

TABLE 1

| Dependence of Photocurrent Response on pH Value of Electrolyte | | |
|---|---|---|
| | | Photocurrent Response (nA/cm$^2$) |
| Sample No. | pH | E = −0.1 V | E = −0.3 V |
| 1 | 4.0 | 0 | 0 |
| 2 | 4.5 | 0 | 0 |
| 3 | 5.0 | 10 | 20 |
| 4 | 7.0 | 100 | 180 |
| 5 | 8.5 | 180 | 210 |
| 6 | 9.0 | 160 | 180 |
| 7 | 10.0 | 40 | 45 |
| 8 | 11.0 | 0 | 0 |

What is claimed is:

1. A photoelectric transducer comprising, in sequence, an electrically conductive electrode substrate, an oriented film of a photosensitive chromoprotein, an electrolyte, and a counter electrode.

2. A photoelectric transducer as in claim 1, wherein said photosensitive chromoprotein is bacteriorhodopsin or a derivative thereof.

3. A photoelectric transducer as in claim 2, wherein the molecules of said bacteriorhodopsin are oriented in such a direction that the amino-terminal of each protein molecule is oriented toward the electrically conductive electrode substrate.

4. A photoelectric transducer as in claim 1, wherein the electrically conductive electrode substrate is in an electrochemically cathodic polarization state.

* * * * *